Aug. 19, 1958 D. A. McCAULAY 2,848,511
DURENE PROCESS
Filed July 26, 1955
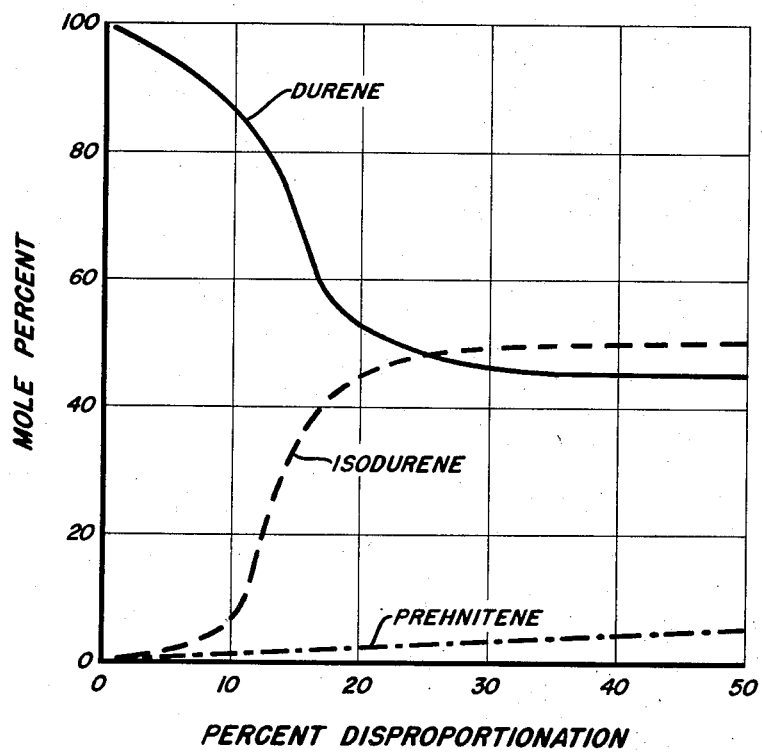
INVENTOR.
David A. McCaulay
BY
Michael Dufincey
ATTORNEY

United States Patent Office 2,848,511
Patented Aug. 19, 1958

2,848,511

DURENE PROCESS

David A. McCaulay, Chicago, Ill., assignor to Standard Oil Company, Chicago, Ill., a corporation of Indiana Application July 26, 1955, Serial No. 524,507

5 Claims. (Cl. 260—668)

This invention relates to the production of durene by the disproportionation of pseudocumene.

Very recently the chemical industry has become intensely interested in tetraalkylbenzenes wherein the alkyl group is either methyl or ethyl. These tetraalkylbenzenes may be converted to various alkyl benzoic acids; particularly there is interest in the benezene nucleus containing 4 carboxylic groups. Most interest is concentrated in the tetramethylbenzene having the durene configuration, i. e., 1,2,4,5- which leaves two unsubstituted ring positions in para orientation.

The tetramethylbenzenes are not particularly plentiful in either coal carbonization liquids or in catalytic reformate from conversion of petroleum naphthas. Furthermore, the close-boiling aromatic hydrocarbons containing a total of 10 carbon atoms make the problem of obtaining high purity tetramethylbenzenes exceedingly difficult and expensive. Catalytic reformate from the conversion of petroleum naphtha does contain quite large amounts of benzenes containing a total of 9 carbon atoms, primarily trimethylbenzenes and ethyltoluenes. It is possible by fractional distillation to obtain a fraction consisting essentially of about 90 mole percent trimethylbenzenes and not more than about 10 mole percent of ethyltoluene; with some loss in yield of trimethylbenzene, it is feasible to reduce the ethyltoluene content to on the order of 5%. Pseudocumene can be obtained in high purity, i. e., 95% or more, by careful distillation of a trimethylbenzene fraction.

An object of this invention is the production of durene from pseudocumene. Another object of the invention is a process for disproportionating pseudocumene to a mixture of tetramethylbenzenes containing a very high percentage of durene. A particular object is a disproportionation process for converting pseudocumene principally to durene and with little loss of pseudocumene to other trimethylbenzenes. Other objects will become apparent in the course of the detailed description.

The figure shows in graphical form the results of disproportionating pseudocumene to various percent conversions.

In the process of this invention, a pseudocumene feed is contacted with between about 25 and 400 volume percent, based on feed, of liquid HF catalyst; the contacting is carried out at a temperature between about 80° C. and 160° C. for a time such that not more than about 12 mole percent of the pseudocumene in the feed is converted by disproportionation. The reaction at about 12% conversion produces a product hydrocarbon mixture containing a tetramethylbenzene product having at least 80 mole percent of durene; the other tetramethylbenzenes being isodurene and prehnitene.

The hydrocarbon feed to the durene process may be entirely pseudocumene (1,2,4-trimethylbenzene) or it may contain amounts of the other trimethylbenzene isomers, namely hemimellitene (1,2,3-trimethylbenezene) and mesitylene (1,3,5-trimethylbenzene). The presence of hemimellitene and mesitylene in the feed has an adverse effect on the amount of durene present at a given conversion of pseudocumene and therefore the feed to the process should contain not more than about 5 mole percent of the other trimethylbenzene isomers or ethyltoluene.

It has been discovered that pseudocumene, in the presence of liquid HF catalyst, forms, as the first product of disproportionation, durene. Apparently the durene then isomerizes in the presence of the liquid HF catalyst to form the other tetramethylbenzene isomers, namely isodurene and prehnitene. By careful control of the degree of conversion of the pseudocumene feed, it is possible to obtain a tetramethylbenzene product which is prinicipally durene. At conversions exceeding about 12 mole percent of the pseudocumene, the durene content of the tetramethylbenzene product decreases very very sharply. At about 12 mole percent conversion of the pseudocumene in the feed, the tetramethylbenzene product contains at least 80 mole percent of durene; when using a pure pseudocumene feed, the tetramethylbenzene product contains about 85 mole percent of durene. By maintaining the degree of conversion or percent disproportionation of the pseudocumene feed in the range of about 5 to 8 mole percent, it is possible to obtain a tetramethylbenzene product which contains more than 92 mole percent durene.

In addition to the disproportionation reaction, the pseudocumene undergoes the isomerization reaction wherein the other trimethylbenzenes, namely hemimellitene and mesitylene are formed. However, the rate of isomerization is much lower than the rate of disproportionation and at the 12% disproportionation, the trimethylbenzene portion of the hydrocarbon product consists of about 95% pseudocumene and the remainder mesitylene and hemimellitene. Thus the trimethylbenzene in the hydrocarbon product at 12% disproportionation of pseudocumene feed is a suitable feed to the disproportionation reaction. The amount of non-pseudocumene material in the trimethylbenzene fraction is further reduced when operating in the preferred region of percent disproportionation namely 5 to 8 mole percent of pseudocumene feed.

In addition to the isomerization reaction product and the disproportionation reaction product, i. e., tetramethylbenzenes, xylenes are also produced in the disproportionation reaction. Under the conditions of disproportionation the xylene fraction contains only two isomers, namely ortho-xylene and meta-xylene. Under these conditions no para-xylene is produced. Thus it is possible to obtain high ortho-xylene and high purity meta-xylene from the hydrocarbon product of this process by fractional distillation of the xylene product since there is no para-xylene to complicate the separation.

The catalyst utilized in the process may be anhydrous liquid hydrogen fluoride or substantially anhydrous liquid hydrogen fluoride, for example, commercial anhydrous hydrofluoric acid. In order to maintain a high level of catalyst activity, the liquid HF catalyst should contain not more than about 2 or 3 weight percent of water.

In order to maintain the water content of the system at a low level, the entire process is carried out under substantially anhydrous conditions, i. e., the feed hydrocarbons themselves must be of low water content in order to avoid introducing deleterious amounts of water into the system.

It has been found that the trimethylbenzenes disproportionate very readily when utilizing substantially anhydrous liquid HF catalyst. The rate of conversion is so great that it is not necessary to use very large amounts of catalyst. Appreciable conversion can be obtained with rather small amounts of catalyst. In general, the catalyst usage will lie between 25 volume percent and 400 volume percent based on feed hydrocarbons. It is preferred to operate with between about 50 and 150 volume percent of catalyst.

The process is carried out at a temperature within the range of about 80° C. and 160° C. Temperatures below about 80° C. require uneconomically long times. The reaction times at temperatures above about 160° C. are so short that it is extremely difficult to control the reaction in order to obtain just the desired amount of pseudocumene disproportionation. The best balance of contacting time and catalyst usage appears to be obtained by operation in the temperature range of about 120° C. and 140° C. At constant disproportionation of pseudocumene, the contacting time is dependent upon not only the temperature of contacting but also in the amount of HF catalyst present. Broadly, at fixed catalyst usage, the lower the temperature of contacting, the longer the corresponding time to reach the desired degree of disproportionation. At a fixed temperature, the lower the catalyst usage, the longer the corresponding time needed to attain the desired degree of disproportionation. When operating with the preferred catalyst usage of between about 50 and 150 volume percent, based on feed, at the preferred temperature of 120° C. and 140° C., the time to reach a disproportionation of about 12% is between about 5 minutes and 65 minutes, the lower times corresponding to the higher temperatures and the higher catalyst usages.

Based on experimental data, the relationship between temperature, catalyst usage, and time to reach a conversion of 12% when operating with pure pseudocumene as the feed has been calculated. This relationship is set out in Table I. The flexibility of the process is clearly shown by the relationship set out in Table I. The degree of conversion may be controlled very accurately for a given piece of equipment by proper adjustment of the operating temperature and the amount of catalyst used.

TABLE I

| °C. | Minutes for 12% Conversion | | |
| --- | --- | --- | --- |
| | HF, Vol. Percent on Feed | | |
| | 50 | 100 | 150 |
| 100 | 320 | 160 | 106 |
| 120 | 63 | 32 | 21 |
| 140 | 15 | 8 | 5 |
| 160 | 4 | 2 | 2— |

It is to be understood that the process of this invention is a liquid phase reaction and sufficient pressure must be maintained on the system in order to keep both the feed hydrocarbons and the HF catalyst in the liquid state.

Durene, which has a melting point of about 80° C., is very readily separated by fractional crystallization from the isodurene and prehnitene isomers which melt respectively at —24° C. and —6° C. Thus by a very simple conventional fractional crystallization procedure it is possible to separate essentially pure durene from the tetramethylbenzene product of this process. Since isodurene and prehnitene have a boiling point difference of about 7° C., high purity prehnitene may be readily produced by fractional distillation of the mother liquor from the fractional crystallization procedure.

The results obtainable by the process of the invention are set out in several illustrative examples. The tests were carried out in a one-liter Hastelloy autoclave provided with a motor-driven stirrer. In the experimental procedure, the feed hydrocarbon was charged to the autoclave and the whole heated to about 30° C. above the desired reaction temperature. The liquid HF catalyst (commercial anhydrous hydrofluoric acid containing 99.5% HF) was then charged to the autoclave; the desired reaction temperature was thereby reached within a few seconds. The mixture was stirred for the desired time and at the end of this time the entire mixture was withdrawn into a polyethylene flask immersed in a Dry-Ice acetone bath. About one volume of cold water per volume of liquid HF charged was added to the flask. The upper layer of hydrocarbons was separated from the lower aqueous layer. The hydrocarbon layer was neutralized and fractionated through a distillation column providing about 30 theoretical plates. The close-boiling fractions were analyzed by infrared absorption techniques for individual isomer content. The pseudocumene utilized was 99.4% pure.

*Example*

In this example, 4 runs were carried out utilizing essentially pure pseudocumene as the feed. The runs were carried out at conditions such that a different amount of disproportionation of the pseudocumene was obtained in each run. The results of these runs are set out in Table II. In order to show more vividly the results, the composition of the product tetramethylbenzenes has been set out graphically on the annexed figure which forms a part of this specification. In run No. 1, 12% of the pseudocumene was converted to xylene and tetramethylbenzene. In this run, the tetramethylbenzene product contained 85 mole percent of durene; the trimethylbenzene fraction of the mixture of hydrocarbons contained 96% of pseudocumene and 4% of mesitylene.

In run No. 2, 18% of the pseudocumene was disproportionated. The small increment of conditions needed to raise the disproportionation from the 12% of run No. 1 to the 18% of run No. 2 resulted in a tetramethylbenzene product containing only 55% of durene. The trimethylbenzene fraction from this run contained only 85% of pseudocumene, the remainder being mesitylene and hemimellitene.

Runs No. 3 and 4 show that operation at even 30% of conversion of pseudocumene resulted in a tetramethylbenzene product predominating in isodurene. Run No. 4 is believed to have attained the equilibrium tetramethylbenzene isomer distribution, namely prehnitene, 5%, isodurene, 50% and durene, 45%.

The figure shows very clearly that about 12% of conversion of an essentially pure pseudocumene feed is about the maximum amount of conversion which could still give a tetramethylbenzene product which is principally durene. By operating at conversion below about 8%, it is possible to produce a tetramethylbenzene product containing as much or more than 92 mole percent of durene.

In the examples, the hydrocarbons have been separated from the HF catalyst by quenching the system with cold water. Since this procedure produces a dilute acid which is of no value for reuse without reprocessing, it is primarily a laboratory technique. At about 100° C. the trimethylbenzenes are soluble in liquid HF to the extent of about 15 volume percent so that two phases always exist in the contacting zone. The hydrocarbon phase may be separated from the acid phase by decantation or other physical separation means. When the conversion is being carried out so that the equilibrium mixture of tetramethylbenzenes is the product, the separated acid phase containing dissolved hydrocarbons may be recycled directly to the contacting zone. Or the HF may be recovered in a substantially pure form by distilling or flashing the HF away from the higher boiling dissolved hydrocarbons. Owing to the very low boiling point of liquid HF, this separation may be carried out under pressure without cooling the liquid HF too greatly.

Table II
PSEUDOCUMENE FEED

| Run No. | 1 | 2 | 3 | 4 |
|---|---|---|---|---|
| HF, Vol. Percent on Feed | 100 | 100 | 125 | 100 |
| Temperature, °C | 100 | 100 | 100 | 165 |
| Time, Minutes | 10 | 60 | 240 | 240 |
| Product Recovery, wt. Percent | 98 | 97 | 94 | 95 |
| Product Distribution, Mole Percent: | | | | |
| Toluene | 0 | 0 | 0 | 2 |
| Xylene | 6 | 9 | 15 | 22 |
| Trimethylbenzene | 88 | 82 | 70 | 51 |
| Tetramethylbenzene | 6 | 9 | 15 | 25 |
| Product Trimethylbenzene, Mole Percent: | | | | |
| Pseudocumene | 96 | 85 | ------ | 65 |
| Mesitylene | 4 | 12 | ------ | 30 |
| Hemimellitene | 0 | 3 | ------ | 5 |
| Product Tetramethylbenzene, Mole Percent: | | | | |
| Durene | 85 | 55 | 47 | 45 |
| Isodurene | 13 | 42 | 49 | 50 |
| Prehnitene | 2 | 3 | 4 | 5 |
| Product Xylene, Mole Percent: | | | | |
| Ortho- | 50 | 50 | 45 | 25 |
| Meta- | 50 | 50 | 50 | 61 |
| Para- | 0 | 0 | 5 | 14 |

The foregoing data show that by the process of this invention it is possible to carry out a most economical durene production process wherein very small percentages of the pseudocumene feed are degraded to undesired trimethylbenzene isomers and to undesired tetramethylbenzene isomers. By operation under these conditions, tetramethylbenzene product is produced which contains very little of the low melting point isodurene and prehnitene. Not only is the yield of the desired durene enhanced, but the processing of the tetramethylbenzene material by fractional crystallization and distillation in order to produce pure durene is decreased in volume.

Thus having described the invention, what is claimed is:

1. A process for the production of durene which comprises contacting, under substantially anhydrous conditions, a feed consisting essentially of pseudocumene with liquid HF catalyst, in an amount between 25 and 400 volume percent, based on said feed, at a temperature between about 80° C. and 160° C. for a time such that not more than about 12 mole percent of said pseudocumene is converted, removing HF from a product hydrocarbon mixture and separating from said mixture a tetramethylbenzene product containing at least 80 mole percent of durene.

2. The process of claim 1 wherein said catalyst usage is between about 50 and 150 volume percent.

3. The process of claim 2 wherein said temperature is between about 120° C. and 140° C., said conversion is about 12% and the time is between about 5 minutes and 65 minutes, the lower times corresponding to the higher temperatures and higher catalyst usages.

4. A durene production process which comprises contacting a feed consisting essentially of pseudocumene with liquid HF catalyst, in an amount between about 50 and 150 volume percent, based on said feed, at a temperature between about 120° C. and 140° C. for a time between about 2 minutes and 30 minutes, the longer times corresponding to the lower temperatures, removing HF from product hydrocarbons comprising xylene, trimethylbenzene and tetramethylbenzene and separating therefrom tetramethylbenzene product containing at least 90% durene.

5. The process of claim 4 wherein said product trimethylbenzene is recycled to the contacting step.

References Cited in the file of this patent
UNITED STATES PATENTS 2,416,184     Lee et al. _____ Feb. 18, 1947